United States Patent
Kadaba et al.

(10) Patent No.: US 7,158,504 B2
(45) Date of Patent: Jan. 2, 2007

(54) MULTIPLE MODE DATA COMMUNICATION SYSTEM AND METHOD AND FORWARD AND/OR REVERSE LINK CONTROL CHANNEL STRUCTURE

(75) Inventors: Srinivas R. Kadaba, Chatham, NJ (US); Farooq Ullah Khan, Manalapan, NJ (US); Eshwar Pittampalli, Randolph, NJ (US); Ashok N. Rudrapatna, Basking Ridge, NJ (US); Ganapathy Subramanian Sundaram, Edison, NJ (US); Subramanian Vasudevan, Chatham, NJ (US); Yunsong Yang, Piscataway, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 765 days.

(21) Appl. No.: 09/861,967

(22) Filed: May 21, 2001

(65) Prior Publication Data

US 2002/0172217 A1 Nov. 21, 2002

(51) Int. Cl.
*H04B 7/212* (2006.01)
*H04Q 7/20* (2006.01)

(52) U.S. Cl. .................. 370/348; 370/443; 455/450; 455/509

(58) Field of Classification Search ............... 370/328, 370/338, 335, 465, 329, 342, 441, 209, 437, 370/331, 348, 468, 443; 455/450, 454, 70, 455/453, 509
See application file for complete search history.

(56) References Cited

U.S. PATENT DOCUMENTS

| | | | | |
|---|---|---|---|---|
| 5,684,791 A | * | 11/1997 | Raychaudhuri et al. | 370/310.2 |
| 5,914,950 A | * | 6/1999 | Tiedemann et al. | 370/348 |
| 5,923,650 A | * | 7/1999 | Chen et al. | 370/331 |
| 5,956,644 A | * | 9/1999 | Miller et al. | 455/453 |
| 5,966,384 A | * | 10/1999 | Felix et al. | 370/465 |
| 6,058,106 A | * | 5/2000 | Cudak et al. | 370/313 |
| 6,094,426 A | * | 7/2000 | Honkasalo et al. | 370/331 |
| 6,434,367 B1 | * | 8/2002 | Kumar et al. | 455/70 |
| 6,567,420 B1 | * | 5/2003 | Tiedemann et al. | 370/468 |
| 6,690,938 B1 | * | 2/2004 | Chin | 455/450 |
| 6,757,270 B1 | * | 6/2004 | Kumar et al. | 370/342 |
| 2002/0089947 A1 | * | 7/2002 | Holtzman et al. | 370/328 |
| 2002/0154610 A1 | * | 10/2002 | Tiedemann et al. | 370/329 |
| 2004/0162083 A1 | * | 8/2004 | Chen et al. | 455/454 |

\* cited by examiner

*Primary Examiner*—Alpus H. Hsu

(57) ABSTRACT

A multiple mode data communication system and method provides the flexibility to schedule wireless unit transmissions and/or allow the wireless unit to transmit autonomously. In certain embodiments, the wireless units can transmit autonomously and/or use scheduling depending on the data rate, the length of the data packet or the type of data. For example, the wireless units can transmit autonomously at lower data rates and use scheduling at higher data rates. Thus, the multiple mode system enables wireless unit transmissions to be scheduled and/or be transmit autonomously, and wireless units can simultaneously operate in different scheduling and/or autonomous modes. Depending on the embodiment, the system can provide even greater flexibility in operation by permitting wireless units to be scheduled by a single base station, scheduled by a multiplicity of base stations simultaneously or otherwise, via coordination between base stations, scheduled by a multiplicity of base stations in an uncoordinated and asynchronous manner, allowed to transmit autonomously, and/or allowed to transmit autonomously under base station supervision (i.e. rate control/adjustment by the base station). Additionally, a forward and/or reverse link control channel structure is provided which can be used to implement the multiple mode data communication system and/or support various features enabling increased throughput over a shared data channel in a wireless communications system.

24 Claims, 8 Drawing Sheets

Example of Transmission Procedure at non-Handoff Mobile Station (Scheduling Mode and Transition to Autonomous Mode)

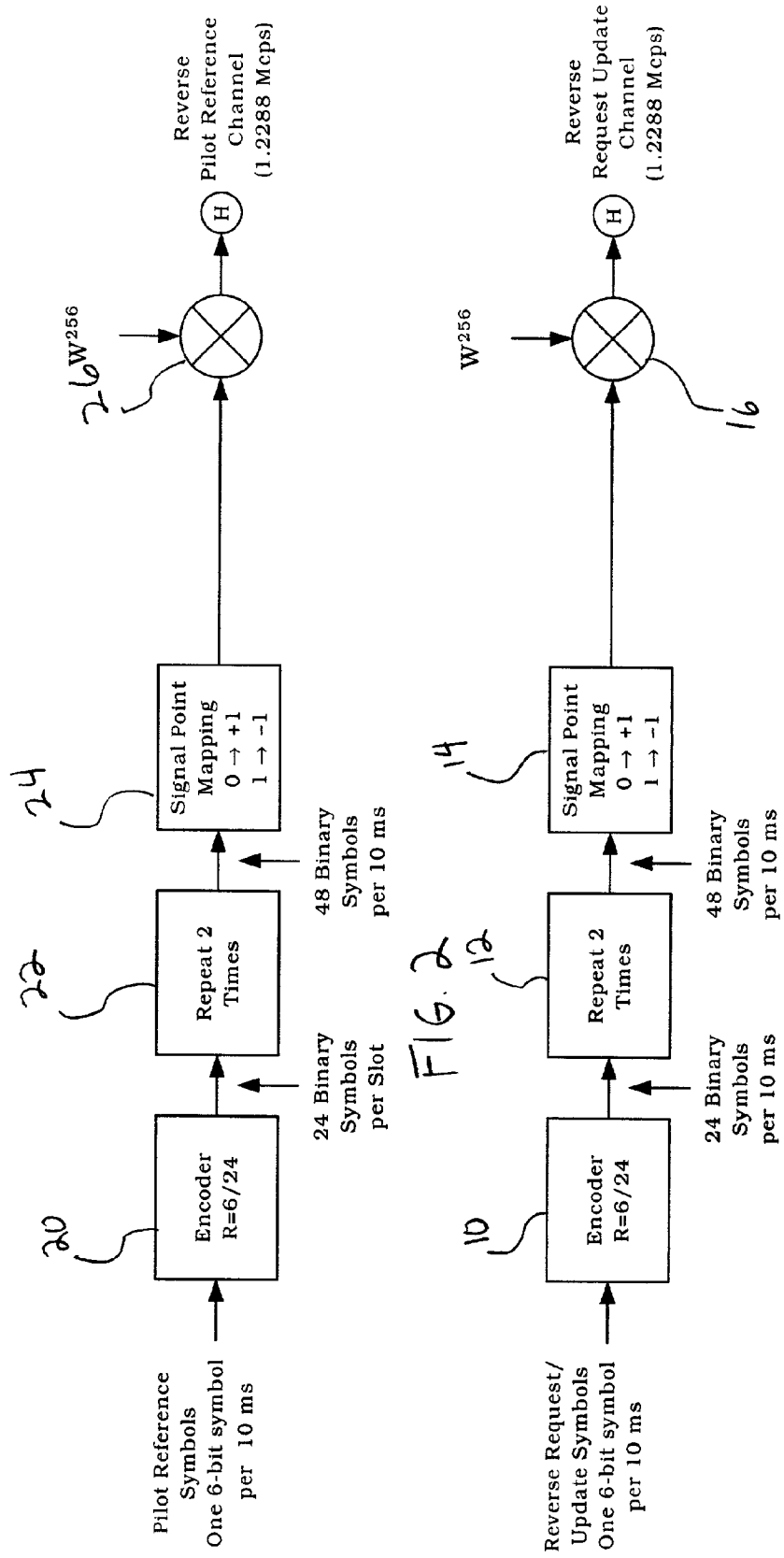

RL Data Encoder Packet Formats (EPF)

| Data Rate [bps] | Number of slots per sub-packet | | | | |
|---|---|---|---|---|---|
| | 6144 bits EP | 4608 bits EP | 2304 bits EP | 768 bits EP | 384 bits EP |
| 9600 | | | | | 32 |
| 19200 | | | | | 16 |
| 38400 | | | | 8 | 8 |
| 76800 | | | | 4 | 4 |
| 153600 | | | 8 | | |
| 230400 | | | 4 | 2 | |
| 307200 | | | 2 | | |
| 460800 | 8 | 8 | | | |
| 614400 | 8 | 4 | | | |
| 921600 | 4 | 2 | | | |
| 1228800 | | | | | |
| 1843200 | 2 | | | | |
| 2457600 | | | | | |

FIG. 3

Structure of Enabling Channels (2) – Reverse Link

Example of Transmission Procedure at non-Handoff Mobile Station
(Scheduling Mode and Transition to Autonomous Mode)

Example of Transmission Procedure at non-Handoff Mobile Station (Scheduling Mode with Waiting Period Indication Option and Transition to Autonomous Mode)

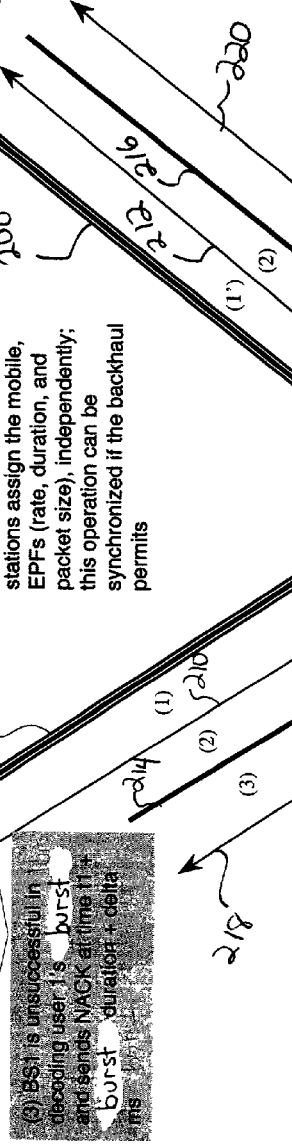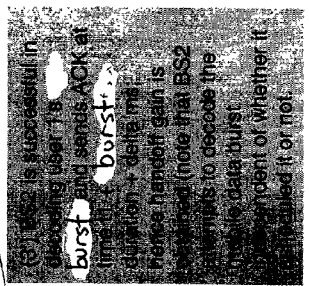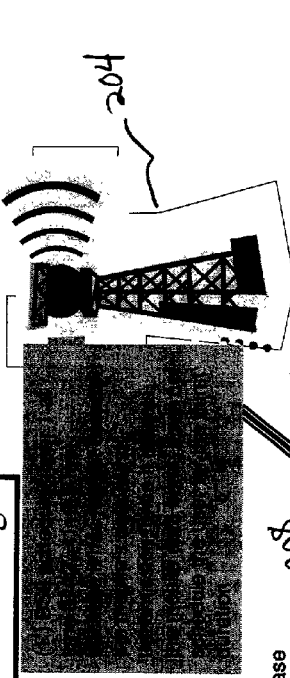
FIG. 10

MULTIPLE MODE DATA COMMUNICATION SYSTEM AND METHOD AND FORWARD AND/OR REVERSE LINK CONTROL CHANNEL STRUCTURE

BACKGROUND OF THE INVENTION

1. Field of The Invention

This invention relates to wireless communications and, more particularly, to a multiple mode data communication system and method and a forward and/or reverse link control channel structure to support various features.

2. Description of Related Art

Wireless communications systems include conventional cellular communication systems which comprise a number of cell sites or base stations, geographically distributed to support transmission and receipt of communication signals to and from wireless units which may actually be stationary or fixed. Each cell site handles voice communications over a particular region called a cell, and the overall coverage area for the cellular communication system is defined by the union of cells for all of the cell sites, where the coverage areas for nearby cell sites overlap to some degree to ensure (if possible) contiguous communications coverage within the outer boundaries of the system's coverage area.

When active, a wireless unit receives signals from at least one base station or cell site over a forward link or downlink and transmits signals to (at least) one cell site or base station over a reverse link or uplink. There are many different schemes for defining wireless links or channels for a cellular communication system, including TDMA (time-division multiple access), FDMA (frequency-division multiple access), and CDMA (code-division multiple access) schemes. In CDMA communications, different wireless channels are distinguished by different codes or sequences that are used to encode different information streams, which may then be modulated at one or more different carrier frequencies for simultaneous transmission. A receiver can recover a particular information stream from a received signal using the appropriate code or sequence to decode the received signal.

Due to the delay-intolerant nature of voice communication, wireless units in conventional cellular systems transmit and receive over dedicated links between a wireless unit and a base station. Generally, each active wireless unit requires the assignment of a dedicated link on the forward link and a dedicated link on the reverse link. Traditional data applications are typically bursty and, unlike voice communications, relatively delay tolerant. As such, using dedicated links to transmit data is an inefficient use of network resources. Wireless communications systems are evolving that will support a variety of data services, such as wireless web browsing.

In a well known data only evolution of the third generation CDMA standard (hereinafter referred to as 3G-1x EVDO), data is transmitted on the forward link over a time division multiplexed carrier at fixed data transmit powers but at variable data rates. Measured signal to interference ratio (SIR) at the receiver is used to determine a data rate which can be supported by the receiver. Typically, the determined data rate corresponds to a maximum data rate at which a minimum level of quality of service can be achieved at the wireless unit. Higher measured SIR translates into higher data rates, wherein higher data rates involve higher order modulation and weaker coding than lower data rates. To improve system throughput, the system allows the wireless unit with the best channel, and thereby the highest rate, to transmit ahead of wireless units with comparatively low channel quality. On the reverse link, each user transmits data using a code channel, and users transmit autonomously with little or no synchrony with other users. The base station can signal to the users on a forward link common control channel that a received power threshold has been exceeded. In response, the wireless units perform a persistence test to determine whether to increase or decrease the data rate.

In the Universal Mobile Telecommunications System (UMTS), wireless units communicate with a base station over dedicated channels. To provide efficient wireless data communications on the forward link, UMTS uses a shared channel which can be shared by a plurality of wireless units to receive data. To improve system throughput, the system provides the wireless unit with the best reported rate access to the shared channel. On the reverse link, UMTS uses a time-multiplexed CPCH—(common packet channel) which is not completely defined, but proposals have users transmitting data autonomously using a slotted ALOHA technique where users transmit at any time. If the wireless unit does not receive an acknowledgment, then the wireless unit re-transmits after a random integer number of time slots has passed.

A well known evolution of the third generation CDMA standard (hereinafter referred to as 3G-1x EV-DV), is being developed. On the forward link, voice, data and control information (including signaling and protocol information) are transmitted on the same RF carriers using different Walsh codes. On the reverse link, multiple users transmit over the same RF carrier using the designated Walsh code(s) for the supplemental channel (R-SCH). Each user transmits over the R-SCH using the user's unique long code to distinguish the user from other users.

Two fundamental approaches to improve the throughput of the reverse link supplemental channel have been proposed. One approach which evolved from the 3G CDMA standard is based on scheduling, where the user requests access to the supplemental channel, and the base station allocates resources to the user for the transmission of data over the supplemental channel. It appears that fast scheduling can deliver significant gains via higher data rates/shorter frames and hence better aggregate throughput even after considering the higher overheads. Another approach which evolved from 1xEV-DO is based on autonomous wireless unit transmission. The alternative autonomous approach to wireless unit data transmission may be considered with some kind of wireless unit-specific rate supervision by the base station. Harmonization of these two approaches has been suggested to expedite the reverse link development.

SUMMARY OF THE INVENTION

The present invention involves a multiple mode data communication system and method with the flexibility to schedule wireless unit transmissions and/or allow the wireless unit to transmit autonomously. In certain embodiments, the wireless units can transmit autonomously and/or use scheduling depending on the data rate, the length of the data packet or the type of data. For example, the wireless units can transmit autonomously at lower data rates and use scheduling at higher data rates. Thus, the multiple mode system enables wireless unit transmissions to be scheduled and/or be transmit autonomously, and wireless units can simultaneously operate in different scheduling and/or autonomous modes. Depending on the embodiment, the system can provide even greater flexibility in operation by permitting wireless units to be scheduled by a single base station, scheduled by a multiplicity of base stations simultaneously or otherwise, via coordination between base stations, scheduled by a multiplicity of base stations in an uncoordinated and asynchronous manner, allowed to transmit autonomously, and/or allowed to transmit autonomously under base station supervision (i.e. rate control/adjustment by the base station).

In accordance with another aspect of the present invention, a forward and/or reverse link control channel structure is provided which can be used to implement the multiple mode data communication system and/or support various features enabling increased throughput over a shared data channel in a wireless communications system. In certain embodiments, the control channel structure provides a common control channel(s) on the forward link to provide scheduling grants and for either indicating a waiting period or acknowledgement of data burst and/or providing rate control information. The wireless unit can monitor, receive and transmit on the basis of, simultaneous or asynchronous schedule grants on the common control channel(s) from the base stations in the active set. Depending on the embodiment, the control channel structure can provide a provision to allocate the total received power among multiple wireless units concurrently, asynchronous and adaptive incremental redundancy, a staggered approach to scheduling, acknowledgement of the wireless unit data burst by all active set base stations for wireless units in soft handoff, monitoring, reception and correct decoding of wireless unit data bursts by all active set base station and/or interference cancellation of data bursts from voice frames.

BRIEF DESCRIPTION OF THE DRAWINGS

Other aspects and advantages of the present invention may become apparent upon reading the following detailed description and upon reference to the drawings in which:

FIG. 1 shows a general block diagram of the construction of an embodiment of the Reverse Request Update Channel (R-RUCH);

FIG. 2 shows a general block diagram of the construction of an embodiment of the Reverse Pilot Reference Channel (R-PRCH);

FIG. 3 shows a table with reverse link (RL) Encoder Packet Formats (EPFs);

FIG. 10 illustrates an advantage in the multiple base station scheduling operation of the multiple mode data communication system.

DETAILED DESCRIPTION

Figures 4, 5:
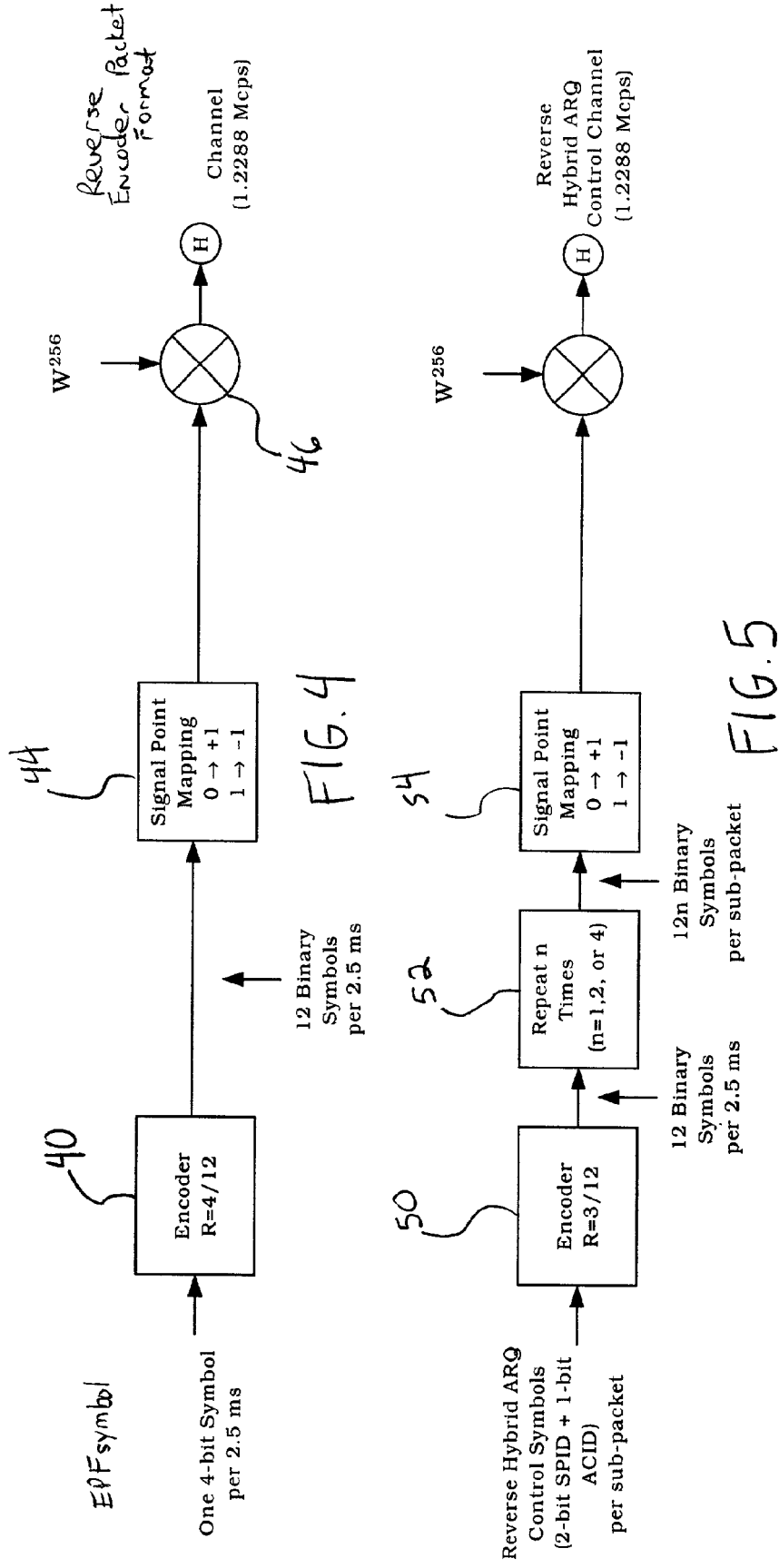
FIG. 4 shows a general block diagram of the construction of an embodiment of the Reverse Encoder Packet Format Indicator Channel (R-EPFICH)
FIG. 5 shows a general block diagram of the construction of an embodiment of the Reverse Hybrid ARQ Control Channel (R-HCCH)

Illustrative embodiments of a multiple mode data communication system in accordance with aspects of the present invention implemented using a forward and/or reverse link control channel structure in accordance with other aspects of the present invention are described with respect to a 1xEV-DV system using a reverse link data channel where the reverse link channel is a supplemental channel (R-SCH). The supplemental channel is formed by using an RF carrier and the designated Walsh code(s), whereby a wireless unit transmits on the supplemental channel using a long code to distinguish from other wireless units. The system provides a hybrid or harmonizing approach allowing a wireless unit to be scheduled and/or transmit autonomously over the reverse link data channel or R-SCH. The system enables a centralized approach to SCH assignment at the base station. A scheduling method is disclosed in U.S. patent application Ser. No. 09/851,100 entitled "Method to Control Uplink Transmissions In a Wireless Communication System" filed May 8, 2001 to Gopalakrishnan et al. and assigned to the same assignee as the present application. Scheduling by the base station can have significant advantages. As a byproduct of scheduling, minimizing the number of simultaneous users at any given instant allows for improved individual through puts and hence higher network throughputs. Scheduling, however, may incur higher overhead than the autonomous scheme. A balance can be struck by giving the wireless unit some autonomy at the lower data rates and data volumes.

Additional flexibility can be provided by enabling the wireless unit to be: a) scheduled by a single base station, b) scheduled by a multiplicity of base stations simultaneously or otherwise, via coordination between base stations, c) scheduled by a multiplicity of base stations in an uncoordinated and asynchronous manner, d) allowed to transmit autonomously, e) allowed to transmit autonomously under base station supervision (i.e. rate control/adjustment by the base station), or f) any combination or sequence of (a) through (e). Throughput can be further enhanced using hybrid automatic retransmission request (ARQ) (Incremental Redundancy or Combining).

In this embodiment, the forward and reverse link control channel structure is provided to enabling such flexible operation. The forward and reverse control channel structure includes four control channels on the reverse link, reverse request update channel (R-RUCH), the reverse pilot reference channel (R-PRCH), the encoder packet format indicator channel (R-EPFICH) and the H-ARQ control channel (R-HCCH). On the forward link, a forward uplink scheduling channel (F-USCH) and a Forward uplink control and acknowledgement channel (F-UCACH) are used.

On the reverse link, the Reverse Request Update Channel (R-RUCH) reports the current status of the wireless unit's buffers. It alerts the base station to the wireless unit's presence, and triggers subsequent scheduling of the wireless unit by base stations that receive this channel from the wireless unit. FIG. 1 shows a block diagram of an embodiment of the R-RUCH structure which carries a 6 bit indicator of mobile buffer size as a scheduling request over a 10 ms. frame. The bit indicator field specifies the wireless unit buffer size in multiples of blocks of bits, such as multiples of 768 bits. All zeroes indicates an empty buffer, and all ones is a 384 bit buffer size indicator which corresponds to the smallest buffer size in this embodiment. As such, when the wireless unit wants to schedule the transmission of its data buffer, the wireless unit sends the buffer size, and all zeroes are sent when the wireless unit is done or if the wireless unit wants to go to autonomous data transmission. When the wireless unit enters or leaves a handoff zone (or changes the active set representing the base station(s) in active communication with the wireless unit), the R-RUCH can be used to send a request to change the set of scheduling base stations, so any new base stations knows of the request and can start scheduling independent of previous requests. The R-RUCH can be gated off when no request updates are needed. Thus, the R-RUCH can be used to activate a scheduling and/or autonomous mode of operation with the base station(s) in the active set by transmitting a series of bits to the active set base station(s), for example when a wireless unit's active set changes moving into or out of handoff.

As shown, the Reverse Request Update symbol (one six bit symbol per 10 ms.) is provided to an encoder 10 which produces a 24 bit symbol from the 6 bit symbol. The resulting 24 bit symbol is repeated at block 12 to produce a 48 bit symbol every 10 ms. The 48 bit symbol is signal point mapped such that a 0 is a +1 and a 1 is a −1 at block 14. Finally, the resulting signal is mixed by mixer 16 with a Walsh code such as a Walsh code in the family of $W^{256}$, such as one of the $W_{48}^{256}$, $W_{112}^{256}$, $W_{176}^{256}$ and $W_{240}^{256}$ codes, to produce the R-RUCH at 1.2288 Megachips per second (Mcps).

The Reverse Pilot Reference Channel (R-PRCH) reports the wireless unit pilot strength to the base station to enable the base station to calculate the instantaneous path loss to the wireless unit (and hence the ability of the mobile to support different data rates). The frequency with which the pilot reference is sent may be adjusted by an upper layer message from the base station to the wireless unit. It is also possible to configure the system so that the pilot reference will be sent only when it is in a one-base station connection and not when the wireless unit is in soft handoff. The R-PRCH can be gated off if not needed. FIG. 2 shows a block diagram of an embodiment of the R-PRCH structure which carries a 6 bit quantization of the wireless unit transmit power at 10 ms. As shown, the Pilot Reference Symbols (one six bit symbol per 10 ms.) is provided to an encoder 20 which produces a 24 bit symbol from the 6 bit symbol. The resulting 24 bit symbol is repeated at block 22 to produce a 48 bit symbol every 10 ms. The 48 bit symbol is signal point mapped such that a 0 is a +1 and a 1 is a −1 at block 24. Finally, the resulting signal is mixed by mixer 26 with a Walsh code such as a Walsh code in the family of $W^{256}$, such as one of the $W_{48}^{256}$, $W_{112}^{256}$, $W_{176}^{256}$ and $W_{240}^{256}$ codes, to produce the R-PRCH at 1.2288 Megachips per second (Mcps).

The Encoder Packet Format Indicator Channel (R-EPFICH) contains the format, i.e. a unique specification of the size, duration, and data rate, of the wireless unit's current transmission. Thus, the format allows the base station to determine the size, duration, and rate of a wireless unit's data burst transmission without ambiguity. Since the format also implies specific coding and modulation parameters, the base station may decode the wireless unit's transmission successfully. In this embodiment, the R-EPFICH accompanies the data burst and implicitly indicates the data rate, data burst or packet size, and duration, such as in the number of time slots, using a total of 4 bits. In cases where the wireless unit is being handed off, the new base station needs to know the format of the data being sent. The 4 bits designate the encoder packet format and refer to an entry in the Reverse Link rate/encoder packet lookup table shown in FIG. 3. In this embodiment, the R-EPFICH accompanies a wireless unit's data burst transmissions either when 1) it is in handoff between two or more base stations, 2) when it is making an unscheduled transmission (autonomous), or 3) when it is unable to obey the encoder packet format specified by the scheduling base station. Thus, the R-EPFICH can be transmitted with encoder packet format along with the data burst to enable all active set base stations to decode the wireless unit's data burst. As such, the sending of the R-EPFICH along with the data burst enables reception of the wireless unit transmissions by multiple base stations. The R-EPFICH can be gated off when not needed. In this embodiment, if a data burst is not sent, the R-EPFICH is not sent. If a data burst is sent, the R-EPFICH may be sent.

FIG. 4 shows a block diagram of an embodiment of the R-EPFICH structure which carries a 4 bit packet format field per 2.5 milliseconds (ms) frame which in this embodiment corresponds to the minimum duration of an allocation of the SCH. As shown, the EPF symbols (one 4 bit symbol per 2.5 ms frame) is provided to an encoder 40 which produces a 12 bit symbol from the 4 bit symbol. The resulting 12 bit symbol is produced every 2.5 ms frame. The 12 bit symbol is signal point mapped such that a 0 is a +1 and a 1 is a −1 at block 44. Finally, the resulting signal is mixed by mixer 46 with a Walsh code such as a Walsh code in the family of $W^{256}$, such as one of the $W_{48}^{256}$, $W_{112}^{256}$, $W_{176}^{256}$ and $W_{240}^{256}$ codes, to produce the R-EPFICH at 1.2288 Megachips per second (Mcps).

The Reverse Hybrid ARQ Control Channel (R-HCCH) indicates whether or not a data burst being transmitted is different from, or a modified version of the same information, as the previous transmission. Thus, the HCCH bits could indicate that the current transmission is the nth version (both base station and mobile are aware of the mechanism by which these versions of the original data are derived) of the same data block. For example, if incremental redundancy is being used for signal reconstruction, the number n of the version of the data burst being retransmitted with incremental redundancy, where n=0 . . . 3 in this embodiment, can be indicated. If combining is being used where retransmissions of the same data burst are power combined, then the bits can indicate which retransmission is being sent. Additional R-HCCH bits may also be used to enable multiple streams of communication from the mobile to the base station.

In this embodiment, the R-HCCH contains 3 bits to aid in Hybrid automatic retransmission request (H-ARQ) operation in the base station which combines error correction and retransmission. Two bits are used to identify the data burst sequence number (00 is a new indicator or first in the sequence), and 1 bit is used to indicate which of 2 H-ARQ streams is being used. At the wireless unit, two virtual streams are produced for the data. In this embodiment, a data burst is sent on a first stream. Before a second packet can be sent on the first stream, an acknowledgment for the first data burst must be received. But, before an acknowledgement is received for the first data burst, a second data burst can be sent on the second stream. If an acknowledgement is received for the first data burst while the second data burst is sent, then a third data burst can be sent on the first stream before the acknowledgment is received for the second data burst and so on. The R-HCCH can be gated off when not needed.

As shown in FIG. 5, the Reverse Hybrid ARQ control symbol (2 bit sub-packet or burst identifier SPID and 1 bit ARQ channel identifier ACID) is provided per data burst to an encoder 50 which produces a 12 bit symbol from the 3 bit symbol. The resulting 12 bit symbol can be repeated n times (n=1,2, or 4) at block 52 to produce 12n bit symbol per 2.5 ms. The 12n bit symbol is signal point mapped such that a 0 is a +1 and a 1 is a −1 at block 54. Finally, the resulting signal is mixed by mixer 56 with a Walsh code such as a Walsh code in the family of $W^{256}$, such as one of the $W_{48}^{256}$, $W_{112}^{256}$, $W_{176}^{256}$ and $W_{240}^{256}$ codes, to produce the R-HCCH at 1.2288 Megachips per second (Mcps).

On the forward link, the Forward Uplink Scheduling Channel (F-USCH) is a common control channel used to provide schedule grants to the requesting party. In this embodiment, the F-USCH identifies the wireless unit that is to transmit at the prescribed time and specifies the transmission format unambiguously. In the context of this system, the transmission format consists of the size of the transmission (in bits), the rate at which the transmission is to occur (in bits per second), and the duration of the transmission (in seconds). Knowledge of any two of these fields implies knowledge of the third. The transmission format may be communicated by specifying any two of these three fields in some manner, either explicitly or as a pointer to an entry in a lookup table. Implicit in the transmission format is the coding and modulation used for the particular transmission. In this embodiment, the F-USCH is a time division multiplexed (TDM) channel with schedule grants to individual wireless units every 2.5 ms. The F-USCH contains a wireless unit identification (MAC ID) and an encoder packet format (EPF) field which is a 4 bit index into the Reverse Link (RL) rate/encoder packet lookup table. The EPF gives an entry into the RL rate/encoder packet lookup table which gives a unique combination of data rate, encoder packet size and number of slots. Given its TDM nature, the F-USCH provides overlap of data burst transmissions from different wireless units. Alternatively, a two channel structure enabling the same functionality as the F-USCH can be used.

The Forward Uplink Control and Acknowledgement Channel (F-UCACH) is used to both control and acknowledge transmissions from the wireless unit. For example, the F-UCACH is a common control channel used to either indicate a waiting period or acknowledge transmissions to the wireless unit and can also provide rate control information. The acknowledgement (or negative acknowledgement) aspect may be used to inform the wireless unit that the base station is aware of its presence in the cell. It may also be used to inform the wireless unit whether or not a data burst from a wireless unit has been received successfully. In its control aspect it can be used to control the rate/power at which the wireless unit transmits. In the case of the 1xEV-DV system, the F-UCACH has a 2.5 ms frame length. In this interval, there are two bits of which one bit indicates the acknowledgement (ACK)/negative acknowledgement (NACK) of a data burst, and the second bit specifies a rate adjustment of the wireless unit transmission (either rate/power up or rate/power down). Alternatively, a two channel structure enabling the same functionality as the F-UCACH can be used where one channel carries rate control/waiting period information and the other channel carries ACK/NACK feedback. As will be described below, depending on the mode of operation and/or the embodiment, the two bits of the F-UCACH can take on different meanings.

By implementing the two forward link control channels as common channels, an additional efficiency is realized. A common channel is shared by multiple users as opposed to a dedicated channel, which is limited to a single user. Thus, in the alternative implementation, multiple dedicated channels are required, one for each of the users in the system.

Alternative embodiments may give different (and context sensitive) meanings to the bits carried on the control channels on the forward and reverse links. In one embodiment, the bits carried on the F-UCACH represent the different time intervals (say 20, 40, 80 or 160 ms when there are 2 bits on the F-UCACH frame per user) the wireless unit can expect to wait before it is scheduled. Any one of the four 2 bit combinations possible is transmitted on the F-UCACH to convey this information in response to any request from the wireless unit for its transmissions to be scheduled. The request from the wireless unit may be carried either as an indication of buffer status on the R-RUCH or, an update of the pilot reference on the R-PRCH. In this embodiment, a response on the F-UCACH is also an implicit acknowledgement of the receipt of the mobile transmission by the base station (in the absence of immediate scheduling information on the F-USCH). The absence of a transmission on both the F-UCACH and the F-USCH indicates to the wireless unit that the base station has not received its transmission (either on the R-RUCH or the R-PRCH). The wireless unit may decide based on the waiting period information whether it should continue to wait for being scheduled or whether it should transit to Autonomous Transmission mode by sending a zero buffer indication on the R-RUCH to cancel the previous scheduling request. In the handoff case where multiple base stations are scheduling the user, the waiting period information may also provide the wireless unit with some knowledge of the relative delay at the base stations, including any base stations who have not made a schedule grant.

The expected waiting period information on F-UCACH also helps eliminate the unnecessary pilot reference updates. During the expected waiting period, the wireless unit still can send pilot reference updates, but only when the pilot reference is significantly improved. The pilot reference update then triggers subsequent scheduling earlier than originally expected.

The control channel structure described above can be used to provide more flexible operation in the transmission of data on the reverse link. The control channel structure can be implemented to provide more flexible scheduling schemes according to the multiple mode data transmission system according to the aspects of the present invention. For example, wireless units that are not in handoff are scheduled by the corresponding base station for all data bursts except for transmissions whose total size is less than or equal to 384 bits (for example Transport Control Protocol (TCP) ACKs). TCP ACKs that cannot be piggybacked, appended or attached to other data go unscheduled on the R-SCH at 9.6 kbps using the 40 ms frames and are accompanied by the R-EPFICH. Unscheduled transmissions are also acknowledged by the base station on the F-UCACH. Wireless units that are in softer handoff (simultaneously communicating with multiple sectors of the same cell) can be scheduled simultaneously at the sectors. Wireless units that are in soft handoff may be scheduled by either one or all active set members.

In order for active set base stations to decode a data burst from the wireless unit, the EPF of the data burst must be known at the active set base stations. As such, soft handoff wireless units always transmit the EPF on the R-EPFICH along with the data burst. To enable scheduling by all active set base stations, the wireless units may resend the current buffer status on the R-RUCH. The R-RUCH serves as a trigger for the active set base stations to start scheduling the wireless unit and also provides the necessary information to each of the schedulers at the active set base stations. An all zero indication on the R-RUCH informs the active set base stations that the wireless unit has emptied its buffer. Additionally, the wireless unit in soft handoff may also transmit autonomously, for example up to a certain rate and duration, if it is not obtaining a pre-specified throughput via schedule grants.

The following examples show how the control channel structure described above enables the operation of the multiple mode data communication system in a flexible manner.

Case 1: Scheduled Operation (Non-Handoff)

1. Wireless unit transmits the R-RUCH and the R-PRCH (buffer status and implied path loss to base station)
2. Base Station responds on the R-UCACH with an acknowledgement
3. Wireless unit continues to resend the R-PRCH at regular intervals
4. Base Station sends schedule grant to mobile at some subsequent time, on the F-USCH
5. Wireless unit transmits R-SCH (the actual data), R-HCCH, and the R-PRCH. The R-EPFICH is also sent if it cannot maintain the data format indicated by the base station on the F-USCH.
6. Base Station Acknowledges on the F-UCACH
7. Wireless unit waits for next schedule grant or sends R-RUCH with all zeros to indicate empty buffers (optional)

Figure 6:
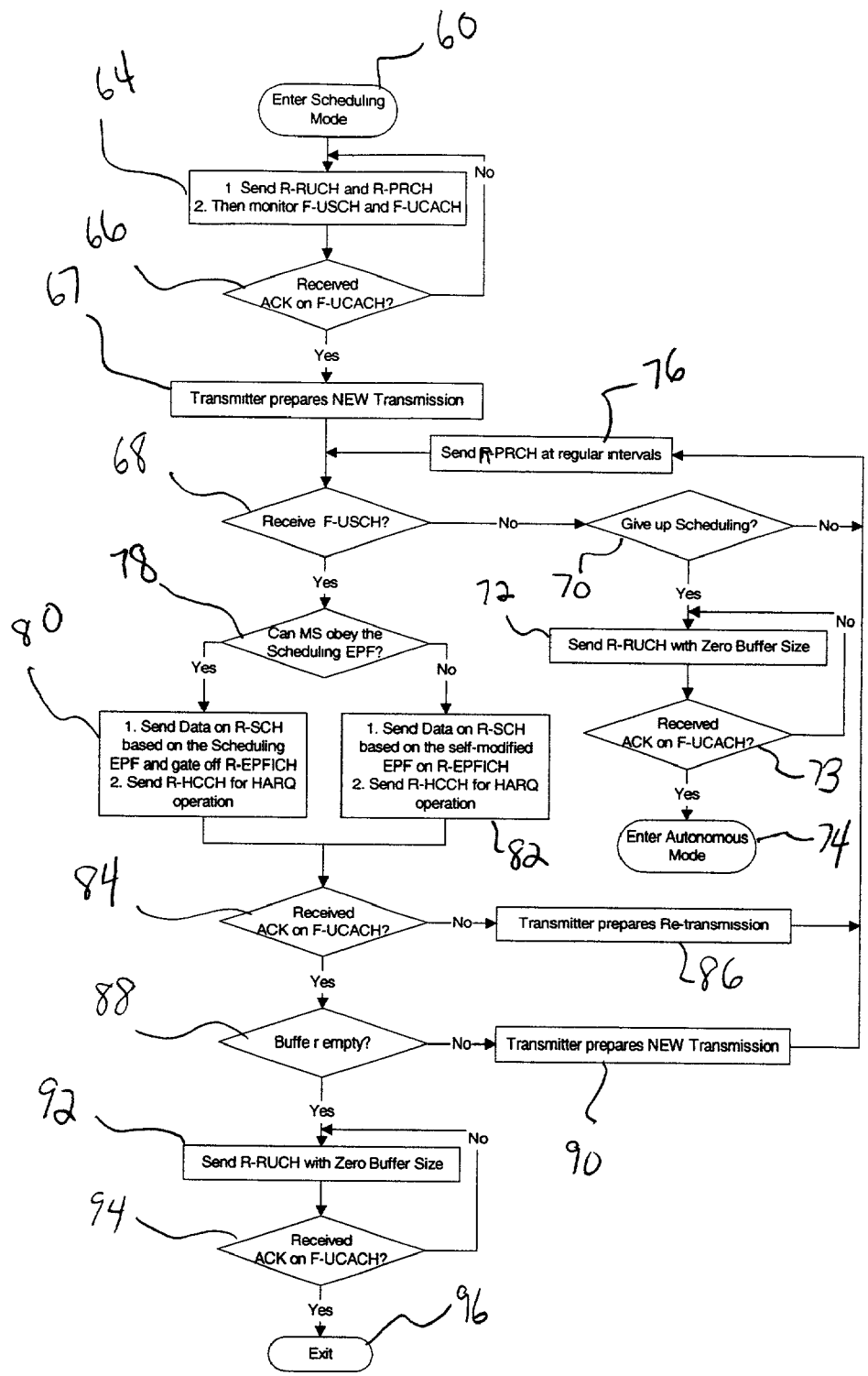
FIG. 6 shows a general flow diagram of an example transmission procedure of the multiple mode data communication system in a non-handoff wireless unit in a scheduling mode with a transition to autonomous mode.

FIG. 6 shows a flow diagram of a case 1 embodiment of how the processing circuitry in a non-handoff wireless unit uses the control channel structure to operate using the multiple mode data communication system in a scheduling mode with a transition to an autonomous mode. As shown in block 60, the wireless unit is in scheduling mode. The processing circuitry proceeds to block 64 where the wireless unit transmits the R-RUCH and the R-PRCH (buffer status and implied path loss to base station). Also, the processing circuitry monitors F-USCH and F-UCACH. If at block 66 the base station responds on the F-UCACH with an ACK, the processing circuitry then prepares a new transmission at block 67 and determines at block 68 if the F-USCH was received. If not, the processing circuitry determines whether to give up scheduling at block 70. If so, the processing circuitry proceeds to block 72 where the wireless unit sends R-RUCH with zero buffer size to cancel the request. At block 73, the processing circuitry determines if an ACK is received on F-UCACH. If not, the processing circuitry returns to block 72. If so, the processing circuitry enters the autonomous mode at block 74.

If, at block 70, the processing circuitry of the wireless unit determines not to give up scheduling, the wireless unit sends R-PRCH at regular intervals at block 76. When the F-USCH is received at block 68, the processing circuitry proceeds to block 78 to determine whether the wireless unit can obey the scheduling EPF. If so, at block 80, the wireless unit sends the data on R-SCH based on the scheduling EPF, and the R-EPFICH is gated off. Also, R-HCCH is transmitted for HARQ operation. Otherwise, if the wireless unit cannot obey the scheduling EPF at block 78, the wireless unit sends data on R-SCH based on the self-modified EPF on R-EPFICH at block 82. Also, the wireless unit transmits the R-HCCH for HARQ operation. After the data is sent, the wireless unit determines if an acknowledgement (ACK) has been received on F-UCACH at block 84. If not, the transmitter prepares for re-transmission at block 86 and then proceeds to block 76. If at block 84 an ACK is received, the processing circuitry proceeds to block 88 to determine if the buffer is empty. If the buffer is not empty, the transmitter prepares the new transmission at block 90 and proceeds to block 76. If the buffer is empty, the wireless unit sends R-RUCH with zero buffer size at block 92 and determines if an ACK is received on F-UCACH at block 94. If not, the processing circuitry proceeds to block 92. If so, the processing circuitry exits the procedure at block 96.

Case 1a: Scheduled Operation (Non-Handoff with Waiting Period Option Enabled)

1. Wireless unit transmits the R-RUCH and the R-PRCH (buffer status and implied path loss to base station)
2. Base Station responds on the R-UCACH with Waiting Period Indicator.
3. Wireless unit monitors F-USCH for scheduling information. During the waiting period, the R-PRCH is sent only when there is a significant improvement on the path loss. The R-PRCH is sent at the end of the waiting period if the mobile has not yet been scheduled.
4. Base Station sends schedule grant to wireless unit at some subsequent time, on the F-USCH.
5. Wireless unit transmits R-SCH (the actual data), R-HCCH, and the R-PRCH. The R-EPFICH is also sent if it cannot maintain the data format indicated by the base station on the F-USCH.
6. Base Station Acknowledges on the F-UCACH. Here the UCACH bit serve to acknowledge successful or unsuccessful reception of the user's data burst transmission.
7. Wireless unit waits for next schedule grant or sends R-RUCH with all zeros to indicate empty buffers (optional)

Figure 7:
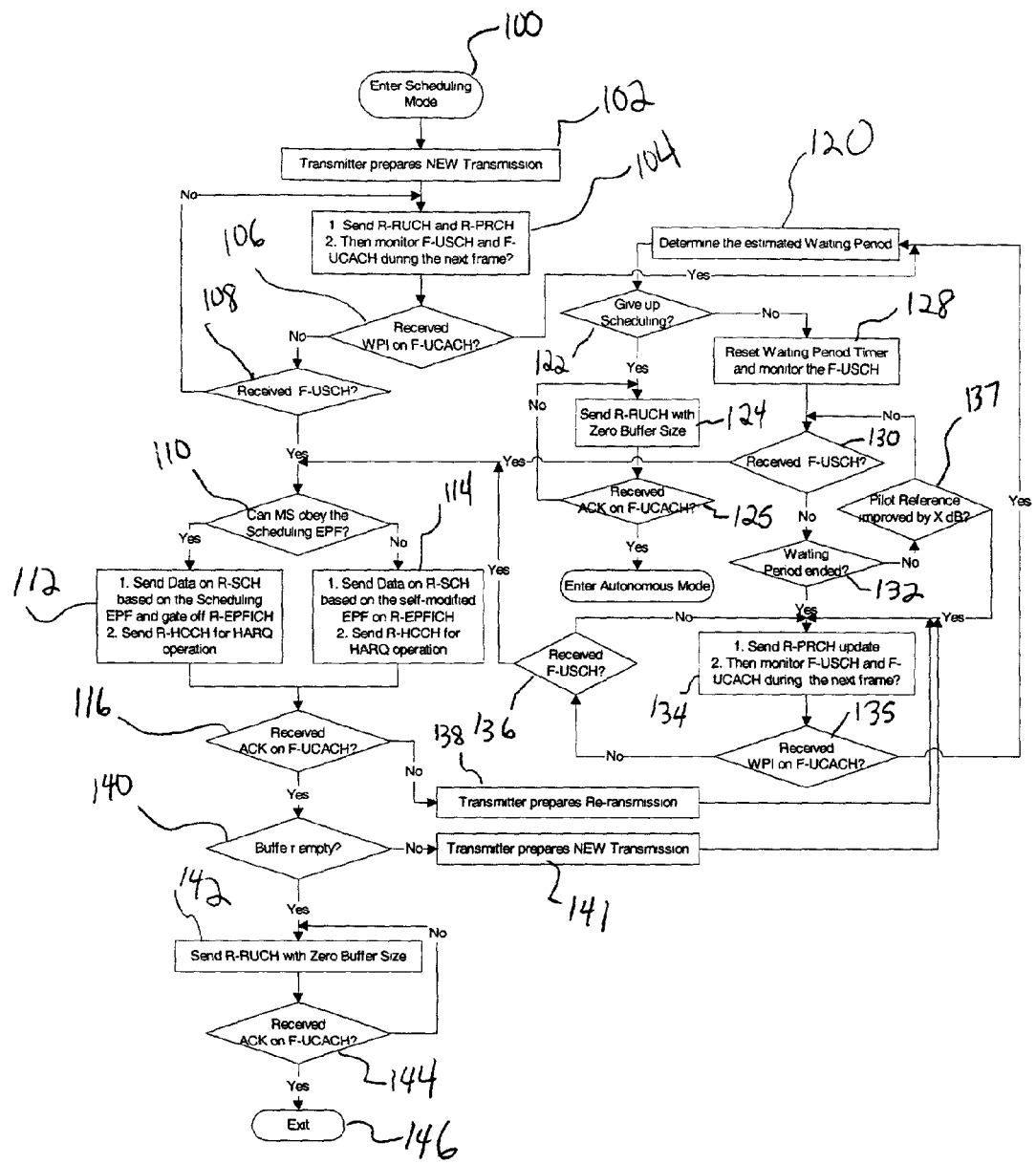
FIG. 7 shows a general flow diagram of an example transmission procedure of the multiple mode data communication system in a non-handoff wireless unit in a scheduling mode with waiting period indication option and a transition to autonomous mode.

FIG. 7 shows a flow diagram of a case 1a embodiment of how the processing circuitry in a non-handoff wireless unit uses the control channel structure to operate in a scheduling mode with a waiting period indication option and transition to an autonomous mode. As shown in block 100, the wireless unit enters the scheduling mode and prepares a new transmission at block 102. The wireless unit transmits the R-RUCH and the R-PRCH at block 104 and monitors F-USCH and F-UCACH during the next frame. If, at block 106, the base station responds on the F-UCACH with a waiting period indicator (WPI), the processing circuitry then determines at block 108 if the F-USCH was received. If not, the processing circuitry returns to block 104. If the F-USCH is received at block 108, the processing circuitry proceeds to block 110 to determine whether the wireless unit can obey the scheduling EPF. If so, at block 112, the wireless unit sends the data on R-SCH based on the scheduling EPF and R-EPFICH is gated off. Also, R-HCCH is transmitted for HARQ operation. Otherwise, if the wireless unit cannot obey the scheduling EPF at block 110, the wireless unit sends data on R-SCH based on the self-modified EPF on R-EPFICH at block 114. Also, the wireless unit transmits the R-HCCH for HARQ operation. After the data is sent, the wireless unit waits for an acknowledgement (ACK) on F-UCACH at block 116.

If at block 106, the F-UCACH is not received, the processing circuitry proceeds to block 120 to determine the estimated waiting period. The processing circuitry then determines whether to give up scheduling at block 122. If so, the processing circuitry proceeds to block 124 where the wireless unit sends R-RUCH with the zero buffer size to cancel the request. If at block 125 an acknowledgement (ACK) is received, the wireless unit enters the autonomous mode at block 126. If an ACK is not received, the processing circuitry returns to block 124. If at block 122 the processing circuitry determines not to give up scheduling, the processing circuitry resets the waiting period timer and monitors the F-USCH at block 128. If at block 130 the F-USCH is received, the processing circuitry proceeds to block 110. Otherwise, the processing circuitry proceeds to block 132 to determine if the waiting period has ended. If so, the processing circuitry proceeds to block 134 where the R-PRCH update is sent and F-USCH is monitored for the next frame. If at block 135 the WPI is received on F-UCACH, the processing circuitry proceeds to block 120. If the WPI is not received, the processing circuitry determines if F-USCH has been received at block 136. If so, the processing circuitry proceeds to block 110. If not, the processing circuitry proceeds to block 134. If at block 132, the waiting period has not ended, the processing circuitry determines at block 137 whether the pilot reference is improved by X dB. If so, the processing circuitry goes to block 134. If not, the processing circuitry proceeds to block 130.

At block 116, the processing circuitry determines whether an ACK is received on F-UCACH. If not, the transmitter prepares for re-transmission at block 138 and proceeds to block 134. If so, the processing circuitry determines whether the buffer is empty at block 140. If the buffer is not empty, the transmitter prepares a new transmission at block 141 and goes to block 134. If the buffer is empty, the wireless unit sends R-RUCH with zero buffer size at block 142. If at block 144 an ACK is received on F-UCACH, the processing circuitry exits the procedure at block 146. Otherwise, the processing circuitry returns to block 142.

Case 2: Maintaining Scheduling and Reception During Handoff

1. All wireless unit data bursts are accompanied by the R-EPFICH and R-HCCH. Thus all base stations in the active set know the format of the wireless unit's transmission and can decode it. This information is essential since none of the base stations can be certain apriori, as to the format and state (new or continued transmission) of the wireless unit's transmission.

2. The R-PRCH may or not be transmitted at regular intervals. If it is transmitted, the frequency of this transmission may be changed (lowered or set to zero) when the wireless unit in is handoff (via an upper layer message during data call setup).

3. Either one or all the base stations send the schedule grant to the wireless unit on their respective F-USCH and acknowledge the wireless unit's transmissions on their respective F-UCACH. If the schedule grants and acknowledgements are simultaneous, the wireless unit follows a rule to determine its transmission format. In all other cases, the wireless unit transmits following the earliest schedule grant. A positive acknowledgement from either base station is interpreted by the wireless unit as a successful transmission.

4. To retrigger the scheduling mechanism in the handoff zone, from being scheduled by a single base station to being scheduled by all the active set base stations, the wireless unit transmits on the R-RUCH. The wireless unit also transmits on the R-PRCH at the same time that the R-RUCH is transmitted. This enables Active Set Base Stations to appropriately schedule the wireless unit.

Figure 8:
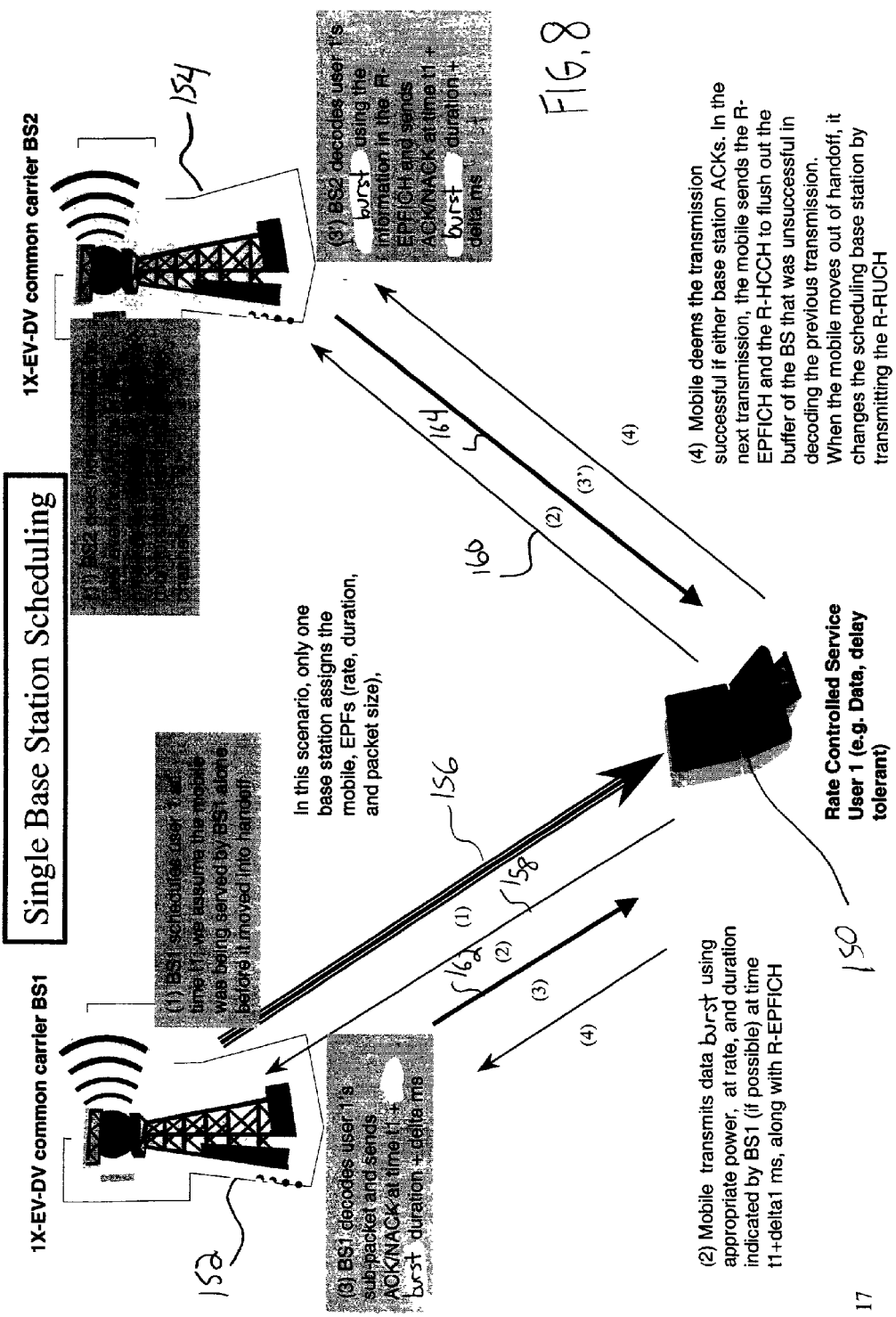
FIG. 8 shows a general signal flow diagram of a single base station scheduling operation of the multiple mode data communication system with a wireless unit in handoff.

FIG. 8 shows a signal flow diagram for a case 2 example of single base station scheduling for a wireless unit 150 in handoff with base station 152 (BS1) and base station 154 (BS2). In this scenario assume that the wireless unit was being serviced by BS1 alone before it moved into handoff. BS1 schedules the wireless unit 150 at time t1 whereby the base station assigns the wireless unit and the EPFs and informs the wireless unit of the schedule grant as indicated by arrow 156. BS2 does not schedule the wireless unit even though it is in the wireless unit's active set. It, however, monitors the wireless unit's reverse channels. The wireless unit 150 transmits a data burst using appropriate power, rate and duration indicated by BS1 (if possible) at time t1+delta1 ms. along with R-EPFICH as indicated by arrows 158 and 160. BS1 decodes the data burst from the wireless unit 150 and sends an ACK/NACK at time t1+burst duration+delta ms as indicated by arrow 162. BS2 decodes the data burst from the wireless unit 150 using the information in the R-EPFICH and sends ACK/NACK at time t1+burst duration+delta ms as indicated by arrow 164. The wireless unit 150 deems the transmission successful if either base station 152 or 154 ACKs. In the next transmission, the wireless unit 150 sends the R-EPFICH and the R-HCCH to flush out the buffer of the base station that was unsuccessful in decoding the previous transmission. When the wireless unit 150 moves out of handoff, it can change the scheduling base station by transmitting the R-RUCH.

Figure 9:
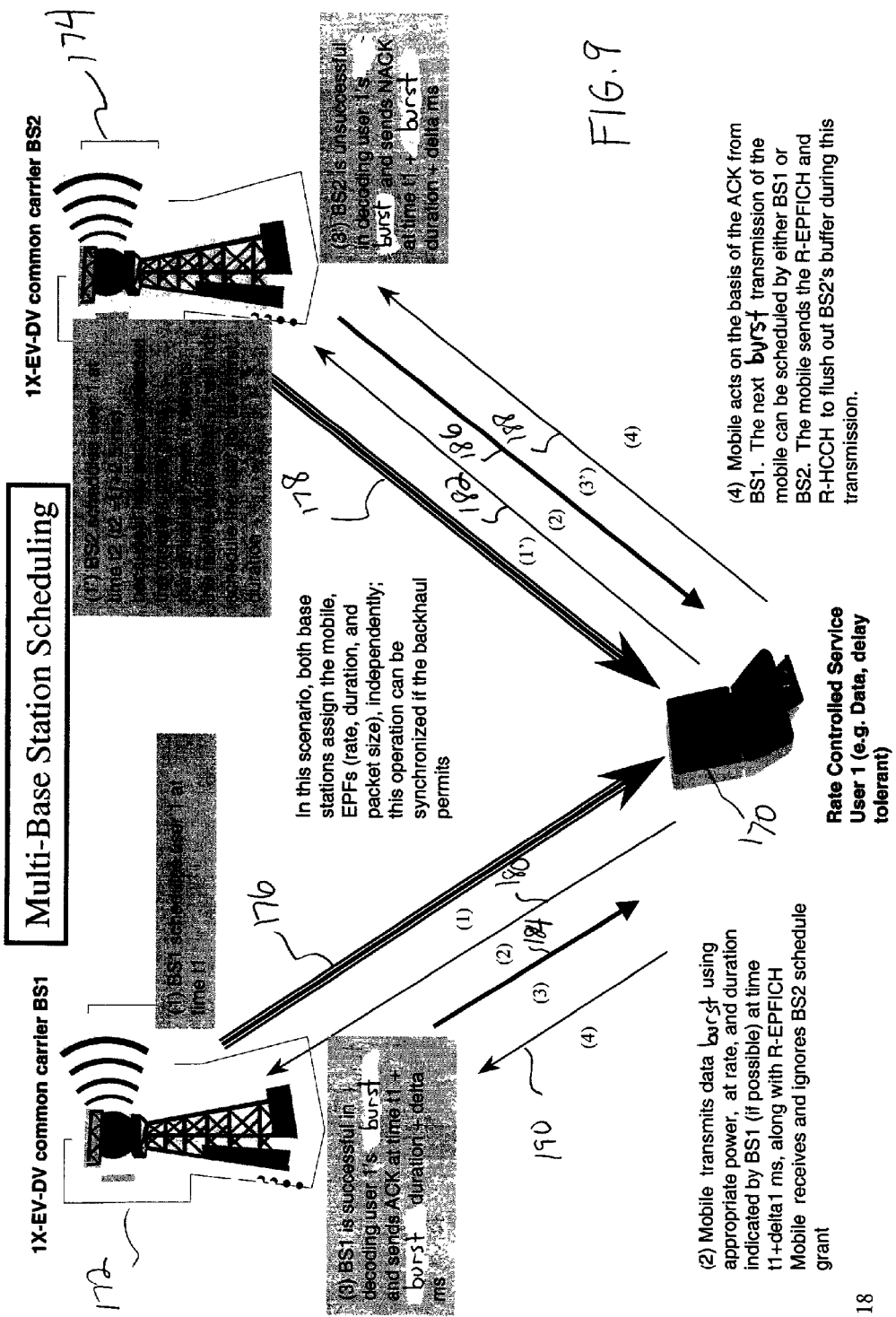
FIG. 9 shows a general signal flow diagram of a multiple base station scheduling operation of the multiple mode data communication system with a wireless unit in handoff.

FIG. 9 shows a signal flow diagram for another case 2 example of multiple base station scheduling for a wireless unit 170 in handoff with base station 172 (BS1) and base station 174 (BS2). In this scenario, both base stations 172 and 174 assign the wireless unit EPF (rate, duration and size) independently. This operation can be coordinated or synchronized if the backhaul permits. BS1 schedules the wireless unit 170 at t1 and informs the wireless unit 170 by transmitting a schedule grant as indicated by arrow 176. BS2 schedules the wireless unit 170 at time t2 (t2=t1+2.5 ms) and informs the wireless unit with a schedule grant as indicated by arrow 178 because it has not yet detected the wireless unit's data burst transmission. Once it detects the wireless unit data burst, it will not schedule the user for the burst duration. As indicated by arrows 180 and 182, the wireless unit 170 transmits a data burst using appropriate power, rate and duration indicated by BS1 (if possible) at time t1+delta1 ms. along with R-EPFICH. The wireless unit 170 receives and ignores the BS2 schedule grant. BS1 is successful in decoding the wireless unit's data burst and sends ACK at time t1+burst duration+delta ms as indicated by arrow 184. BS2 is unsuccessful in decoding the wireless unit's data burst and sends a NACK at time t1+burst duration+delta ms as indicated by arrow 186. The wireless unit 170 acts on the basis of the ACK from BS1. The next data transmission of the wireless unit can be scheduled by either BS1 or BS2. The wireless unit 170 sends the R-EPFICH and R-HCCH to flush out BS2's buffer during this transmission as indicated by arrows 188 and 190.

FIG. 10 shows a signal flow diagram to illustrate a handoff advantage for a case 2 example of multiple base station scheduling for a wireless unit 200 in handoff with base station 202 (BS1) and base station 204 (BS2). In this scenario, both base stations 172 and 174 assign the wireless unit EPF (rate, duration and size) independently. This operation can be coordinated or synchronized if the backhaul permits. BS1 schedules the wireless unit 200 at t1 and informs the wireless unit 200 of the schedule grant as indicated by arrow 206. BS2 schedules the wireless unit 200 at time t2 (t2=t1+2.5 ms) and informs the wireless unit of the schedule grant as indicated by arrow 208 because it has not yet detected the wireless unit's data burst transmission. Once it detects the wireless unit data burst, it will not schedule the user for the burst duration. As indicated by arrows 210 and 212, the wireless unit 200 transmits a data burst using appropriate power, rate and duration indicated by BS1 (if possible) at time t1+delta1 ms. along with R-EPFICH. The wireless unit 200 receives and ignores the BS2 schedule grant. BS1 is unsuccessful in decoding the wireless unit's data burst and sends NACK at time t1+burst duration+delta ms as indicated by arrow 214. BS2 is successful in decoding the wireless unit's data burst and sends a ACK at time t1+burst duration+delta ms as indicated by arrow 216. Hence, handoff gain is obtained. Note, BS2 attempts to decode the wireless unit data burst independent of whether it scheduled it or not. Finally, the wireless unit 200 acts on the basis of the ACK from BS2. The next data transmission of the wireless unit can be scheduled by either BS1 or BS2. The wireless unit 200 sends out the R-EPFICH and R-HCCH to flush out BS1's buffer during this transmission as indicated by arrows 218 and 220.

Case 3: Change in Handoff State of the Mobile

1. The normal handoff procedures are followed to update the active set of base stations at the network.

2. If the wireless unit desires a change in scheduling base stations to the full set of current active set base stations, it transmits on the R-RUCH to enable scheduler operation at these base stations. The current status of the wireless unit buffer is indicated.

3. The wireless unit also transmits on the R-PRCH at the same time that the R-RUCH is transmitted. This enables active set base stations to appropriately schedule the wireless unit.

Case 4: Autonomous Operation (with Base Station Rate Control)

1. Wireless unit and Base Station negotiate a maximum data rate for autonomous transmission during data call set-up 2. Wireless unit sends R-SCH, R-EPFICH, and R-HCCH. The R-PRCH may or may not be sent depending on power availability at the wireless unit, to assist rate control by the base station.

3. The Base Station(s) acknowledge on the F-UCACH (using an acknowledgement bit) and indicate a change in rate for subsequent transmissions on the F-UCACH (in the same frame as the acknowledgement, using an additional bit). The rate commands may be used to either (a) constrain autonomous operation to the lowest data rate, or (b) preclude autonomous transmissions by the wireless unit except for the transmission of the smallest data blocks at the lowest data rates.

4. The Base Station does not transmit schedule grants for the wireless unit on the F-USCH as long as it detects autonomous transmissions by the wireless unit.

5. Schedule grants received by the wireless unit during burst transmissions are ignored.

Case 5: Softer handoff operation

1. Both sectors have the option of granting the schedule to a wireless unit at the same time on their respective F-USCH 2. The wireless unit decodes both F-USCH and transmits if either one of them carries a schedule grant for it.

3. Both base stations send acknowledgements on the F-UCACH.

4. The wireless unit treats the transmission as successful if either one of the F-UCACH transmissions is interpreted as an ACK 5. Other aspects of the operation are similar to normal scheduled operation Thus, the described multiple mode data communication system and method along with a forward and/or reverse link channel structure provides a flexible system to improve throughput of data transmission on the reverse link. To do so, the system provides the ability to obtain the advantages of both autonomous transmission and scheduling of transmissions over the data channel. In providing harmonization between the different approaches, the system enables the use of various forms of both approaches depending on the embodiment. Wireless units can operate in an autonomous mode under base station supervision with wireless unit transmission rate control. The second half of the F-UCACH frame can be used for transmission of up-down commands to the wireless units that choose the autonomous mode. Fully autonomous operation can be provided and restricted to the transmission of 384 bit packets (when buffer size is less than 384 bits) at a low rate of 9.6 kbps. An autonomous wireless unit can request a switch to scheduled transmission at any time by transmitting current buffer status on the R-RUCH. Additionally, a scheduled wireless unit can switch to an autonomous mode of operation by transmitting a zero buffer indication on the R-RUCH. Finally, all requests to switch mode can be required to be acknowledged and accepted by the base station on the F-UCACH.

The forward and reverse link channel structure as well as the described system has been described for use in a 1xEV-DV system for allocating of resources in transmitting data over the reverse link data channel (S-CH). The system according to the principles of the present invention can be used with different cellular systems and forward and/or reverse link which omit and/or add components and/or use variations or portions of the described system. For example, portions or variations of the described system can be implemented to improve throughput on a forward link data channel. Moreover, the multiple mode data communication system or portions thereof can be implemented using a different forward and/or reverse link control channel structure, and the forward and/or reverse link control channel structure or portions thereof can be used to implement other data transmission schemes. Finally, the described system is described as a data transmission system but it should be understood that aspects of the present invention are performed at the receiver of the data.

It should be understood that the system and portions thereof and of the described system can be implemented in different locations, such as the wireless unit, the base station, a base station controller and/or mobile switching center. Moreover, processing circuitry required to implement and use the described system can be implemented in application specific integrated circuits, software-driven processing circuitry, firmware, programmable logic devices, hardware, discrete components or arrangements of the above components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of communicating data between a wireless unit and at least one base station comprising the steps of:
    transmitting by said wireless unit according to an autonomous mode where data is transmitted autonomously after said wireless unit switches from a scheduling mode after a request for transmission of data is made by said wireless unit; and
    transmitting a sequence of bits on a control channel to said base station to indicate operation in said autonomous mode.

2. The method of claim 1 comprising:
    receiving an indication of a waiting period by said wireless unit while in said scheduling mode prior to a schedule grant that grants a request by said wireless unit for transmission of said data from said wireless unit.

3. The method of claim 1 comprising:
receiving rate control information from said base station to control transmission of data from said wireless unit in said autonomous mode.

4. A method of communicating data between a wireless unit and at least one base station comprising the steps of:
receiving a sequence of bits on a control channel from said wireless unit to indicate operation in an autonomous mode or a scheduling mode; and
receiving data in an autonomous mode where data is received from said wireless unit autonomously after said wireless unit has switched from a scheduling mode and after a request is made by said wireless unit for transmission of data.

5. The method of claim 4 comprising:
transmitting an indication of a waiting period prior to a schedule grant that grants a request by said wireless unit while in said scheduling mode for transmission of said data from said wireless unit.

6. The method of claim 4 comprising:
transmitting rate control information from said base station to control transmission of data from said wireless unit in said autonomous mode.

7. A method of communicating data between a wireless unit and a plurality of base stations comprising the steps of:
receiving a first schedule grant from a first base station of said plurality of base stations and a second schedule grant, which is independent of said first schedule grant, from a second base station of said plurality of base stations for transmission of said data from said wireless unit; and
transmitting said data by said wireless unit according to said first schedule grant and receiving an acknowledgment from at least said second base station that said data was received.

8. The method of claim 7 comprising:
transmitting encoder packet format information for said transmission.

9. The method of claim 7 comprising:
receiving said first and second scheduling grants over a time division multiplexed common control channel.

10. A method of communicating data between a wireless unit and a plurality of base stations comprising the steps of:
transmitting a first schedule grant by a first base station of said plurality of base stations for transmission of data from said wireless unit which receives a second scheduling grant, which is independent from said first schedule grant, from a second base station;
receiving said data according to said second schedule grant; and
transmitting an acknowledgment by at least said first base station that said data was received.

11. The method of claim 10 comprising:
receiving encoder packet format information for said transmission.

12. The method of claim 10 comprising:
transmitting said first scheduling grant over a time division multiplexed said common control channel.

13. A method of transmitting data between a wireless unit and a plurality of base stations, said method comprising the steps of:
transmitting data by said wireless unit using an autonomous mode established for
transmitting data autonomously to at least a first base station of said plurality of base stations; and
transmitting data by said wireless unit using a scheduling mode after a request is granted for transmission of data, which is independent from said the autonomous mode, established for transmitting data between said wireless unit and at least a second base station of said plurality of base stations.

14. The method of claim 13 comprising: autonomously transmitting data at lower data rates; and scheduling transmissions of data at higher data rates.

15. A method of receiving data between a wireless unit and a plurality of base stations, said method comprising the steps of:
receiving data transmitted by a wireless unit using an autonomous mode established for transmitting data autonomously to at least a first base station of said plurality of base stations; and
receiving data transmitted by said wireless unit using a scheduling mode where data is transmitted after a request is made for transmission of data, which is independent from said the autonomous mode, established for transmitting data between said wireless unit and at least a second base station of said plurality of base stations.

16. The method of claim 15 comprising:
autonomously receiving data at lower data rates; and
scheduling transmissions of at higher data rates.

17. A wireless unit for use in communicating data with at least one base station, said wireless unit comprising:
transmission circuitry configured to transmit according to an autonomous mode where data is transmitted autonomously after said wireless unit switches from a scheduling mode after a request for transmission of data is made by said wireless unit, said transmission circuitry further configured to transmit a sequence of bits on a control channel to said base station to indicate operation in said autonomous mode.

18. A data communication system for use in communicating data between a wireless unit and at least one base station, said system comprising:
receiver circuitry configured to receive a sequence of bits on a control channel from said wireless unit to indicate operation in an autonomous mode or a scheduling mode, said receiver circuitry further configured to receive data in an autonomous mode where data is received from said wireless unit autonomously after said wireless unit has switched from a scheduling mode after a request is made by said wireless unit for transmission of data.

19. A wireless unit for use in communicating data with a plurality of base stations, said wireless unit comprising:
transceiver circuitry configured to receive a first schedule grant from a first base station of said plurality of base stations and a second schedule grant, which is independent of said first schedule grant, from a second base station of said plurality of base stations for transmission of said data from said wireless unit, to transmit said data by said wireless unit according to said first schedule grant, and to receive an acknowledgment from at least said second base station that said data was received.

20. A data communication system for use in communicating data between a wireless unit and a plurality of base stations, said system comprising:
transceiver circuitry configured to transmit a first schedule grant by a first base station of said plurality of base stations for transmission of data from said wireless unit which receives a second scheduling grant, which is independent from said first schedule grant, from a second base station, to receive said data according to said second schedule grant, and to transmit an acknowledgment by at least said first base station that said data was received.

21. A wireless unit for use in communicating data with a plurality of base stations, said wireless unit comprising:
   transmitter circuitry configured to transmit data by said wireless unit using an autonomous mode established for transmitting data autonomously to at least a first base station of said plurality of base stations, and to transmit data by said wireless unit using a scheduling mode after a request us granted for transmission of data, which is independent from said the autonomous mode, established for transmitting data between said wireless unit and at least a second base station of said plurality of base stations.

22. A data communication system for use in communicating data between a wireless unit and a plurality of base stations, said system comprising:
   receiver circuitry configured to receive data transmitted by a wireless unit using an autonomous mode established for transmitting data autonomously to at least a first base station of said plurality of base stations, and to receive data transmitted by said wireless unit using a scheduling mode after a request us granted for transmission of data, which is independent from said the autonomous mode, established for transmitting data between said wireless unit and at least a second base station of said plurality of base stations.

23. A method of transmitting data between a wireless unit and a plurality of base stations, said method comprising the steps of:
   transmitting data by said wireless unit using a first scheduling mode established for transmitting data to at least a first base station of said plurality of base stations, where data is transmitted after a request is granted for transmission of data; and
   transmitting data by said wireless unit using a second scheduling mode, which is independent from said first schedule mode established for transmitting data between said wireless unit and at least a second base station of said plurality of base stations, where data is transmitted after a request is granted for transmission of data.

24. A method of receiving data between a wireless unit and a plurality of base stations, said method comprising the steps of:
   receiving data transmitted by a wireless unit using a first schedule mode established for transmitting data after a request is made by the wireless unit to at least a first base station of said plurality of base stations; and
   receiving data transmitted by said wireless unit using a second schedule mode after a request is made by the wireless unit, which is independent from said first schedule mode, established for transmitting data between said wireless unit and at least a second base station of said plurality of base stations.

* * * * *